3,369,012
POLYMERS CONTAINING DIHALO-
CYCLOPROPANE UNITS
Robert Dean Lundberg, St. Albans, W. Va., assignor to Union Carbide Corporation, a corporation of New York
No Drawing. Filed Jan. 16, 1963, Ser. No. 251,728
4 Claims. (Cl. 260—94.7)

The invention relates to new organic polymeric compositions of matter. In a particular aspect, the invention relates to organic polymeric materials containing dihalocyclopropane units within the backbone of the polymer molecule, and to method for preparation of such polymers.

According to the present invention, it has now been discovered that dihalocyclopropane-modified polymers can be prepared by causing to react in liquid medium a normally solid polymer containing internal olefinic unsaturation and a dihalocarbene at a temperature of from about −25° C. to about 50° C. This reaction appears to proceed according to the reaction scheme.

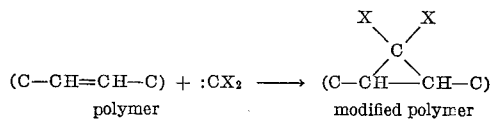

As another aspect of the invention there is provided a new class of halogenated polymers containing cyclopropane units in the backbone which are tough, flame retardant, and which are useful as molding resins and resin impact modifiers.

Introduction of dihalocyclopropane units into the backbone of internally olefinically unsaturated polymeric materials by the process of this invention is a novel method for introduction of halogen atoms into polymers. The method eliminates the need for use of a corrosive free halogen or other poisonous, troublesome, and expensive halogenating agents such as sulfuryl chloride, phosgene, oxalyl chloride, thionyl chloride, and the like. Introduction of halogen-containing three membered rings into unsaturated polymer backbones, in addition to providing novel polymeric compositions, also effects a number of significant changes in the chemical and physical properties of the original unsaturated polymer. For example, cis-1,4-polybutadiene, which is an amorphous rubber, upon reaction with dihalocarbene becomes a more rigid material having a softening point of about 50° C. which is suitable for use as a molding resin and as a resin impact modifier.

Introduction of dihalocyclopropane units into the backbone of the originally olefinically unsaturated polymer chain changes the solvent properties of the original polymer, rendering it less soluble in organic solvents, and greatly increases flame resistance of the original polymer by introducing halogen atoms. Significant also is the highly unexpected fact that introduction of dihalocyclopropane units causes a large increase in the glass transition temperature (Tg). Polybutadiene, for example, which has a Tg in the vicinity of −80° C. or below, is changed by this reaction into a material with a Tg of about +50° C. Thus, even at room temperature this dihalocycloprane-modified polymer is a hard, non-amorphous material.

In this invention, the process is most readily conducted by in situ generation of dihalocarbene, :XC$_2$, from a carbene source by the action of strong base. Most conveniently employed of the carbene sources are the haloforms and the trihaloacetates, although in the present invention any dihalocarbene prepared from any source known in the art can be employed.

Suitable haloforms for use as carbene sources in the invention are those compounds having the structural formula

wherein each X is a halogen atom, which can be the same or different. Examples of various haloforms useful in this invention are fluoroform, chloroform, bromoform iodoform, and mixed haloforms such as CHBrClF, CHBrCl$_2$, CHBr$_2$Cl, CHCl$_2$I, CHBr$_2$F, CHCl$_2$F, and the like. The preferred haloform for use herein is chloroform, HCCl$_3$, because it is inexpensive and readily available and in the presence of strong base proceeds rapidly to dichlorocarbene. In addition, chloroform can simultaneously provide a convenient solvent medium and a carbene source.

Suitable trihaloacetates for use as carbene sources in the invention are those compounds having the structural formula

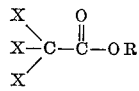

wherein each X is a halogen atom, which can be the same or different, and R can be hydrogen and lower alkyl groups containing from 1 to 6 carbon atoms inclusive.

Examples of the various trihaloacetates useful in this invention are alkali metal salts of trichloroacetic acid, chlorodifluoroacetic acid, dibromochloroacetic acid, and the like; bromodifluoroacetic acid, dichlorobromoacetic acid, and methyl, ethyl, propyl, butyl, pentyl, and hexyl trichloroacetate, chlorodifluoroacetate, dibromochloroacetate, bromodifluoroacetate, dichlorobromacetate, and the like. Methyl trichloroacetate and ethyl trichloroacetate are the preferred trihaloacetates because their use provides polymers containing highest amounts of dichloropropane units.

The reaction of haloforms and trihaloacetates to carbenes is thought to proceed according to the following exempletive reaction schemes, in which X is halogen and R has the significance given above:

(I)    HCX$_3$ + OH$^-$ ⟶ [:CX$_2$] + X$^-$ + H$_2$O (II)
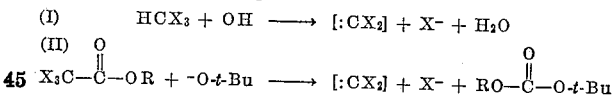

A strong inorganic base must be used to effect formation of dihalocarbene in reactions I and II. Suitable strong bases are the alkali metal hydroxides and alkoxides, particularly sodium methoxide, sodium ethoxide, and potassium t-butoxide. The use of any particular strong base is normally a matter of choice but is sometimes determined by solubility factors, i.e., the solvent in which the reaction is being conducted. At least one mole of base per mole of carbene to be generated is required, although as a practical matter a molar excess of base up to about five is preferably used.

In this invention, in situ-formed dihalocarbene is caused to react with an organic polymer containing internal olefinic double bonds, i.e., carbon-carbon double bonds in the backbone of the polymer, to produce dihalocyclopropane unit-containing polymers, i.e., polymers in which dihalomethylene groups have been bonded cyclically across at least about 5 percent, and as many as 100 percent, of the sites of original unsaturation. Polybutadiene, for example, reacts according to the following equation:

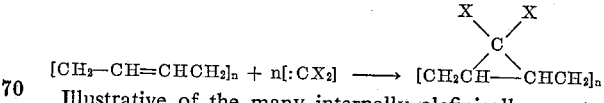

Illustrative of the many internally olefinically unsaturated polymers capable of undergoing reaction with dihalocarbene are unsaturated diene hydrocarbon polymers such as, for example, cis-1,4-polybutadiene, trans-1,4-polybutadiene, cis - 1,4 - polyisoprene, trans - 1,4-polyisoprene, polypentadiene, polyhexadiene, and the like; polymers of chlorinated dienes such as, for example, cis-1,4-polychloroprene and trans-1,4-polychloroprene; alkyl substituted polybutadiene such as the 2-amyl, 2,3-dimethyl, 2-ethyl, 2-methyl-3-n-butyl, and 2-isopropyl polybutadienes, and various copolymers and terpolymers of butadiene, isoprene, chloroprene, and the like with up to about 50 percent by weight of such comonomers as alkyl acrylates, acrylic acid, methacrylic acid, acrylonitriles, butadienes, isoprenes, chloroprenes, butenes, ethylenes, fumarates, maleates, methacrylates, propenes, styrenes, vinyl ethers, vinyl sulfonates, and the like. This list is merely illustrative of the internally olefinically unsaturated polymers which can be modified as described herein, however, and is not intended to be restrictive thereof. These and many other useful internally olefinically unsaturated polymers will be suggested to the skilled chemist by the disclosure of this invention.

The properties of an internally olefinically unsaturated polymer modified by reaction with dihalocarbene are determined to a large extent by the degree of reaction of the carbene intermediate with the unsaturated linkages. Since the stoichiometry of the reaction is one mole of carbene per double bond, the degree of reaction can be controlled by adjusting the amounts of the reactants.

The properties of the dihalocyclopropane-modified polymers can be varied widely, depending on the amount of dihalocyclopropane units incorporated into the original internally olefinically unsaturated polymer. If a resin having a relatively low softening point is desired, for example, this property can be achieved by effecting reaction between dihalocarbene and a small percentage, i.e., at least about 5 to 10 percent, of the unsaturated carbon-carbon linkages in the polymer. If a polymer having a relatively high softening point is required for a particular application, substantially all of the unsaturated linkages in the original polymer can be caused to react with dihalocarbene.

The temperature of the reaction can vary between about —25° C. and about 50° C. Temperatures above about 50° C. can result in gel formation due to side reactions, causing the polymer to be rendered insoluble and intractable. Temperatures below about —25° C. cause the reaction to proceed slowly. The optimum reaction temperature is about 0° C.; at this temperature the reaction proceeds smoothly and efficiently and with a minimum of side reactions. This temperature, therefore, is preferred.

Reaction pressure is not critical. Pressures greater than atmospheric or less than atmospheric can be employed, if desired, but ordinarily do not provide significant advantage over atmospheric pressure. Atmospheric pressure, therefore, is preferred.

The reaction is preferably conducted in a diluent, which can be either a solvent or non-solvent for the unsaturated polymer. Use of a solvent is preferred since polymers containing highest amounts of dihalocyclopropane units are produced thereby.

Suitable diluents for the reaction include the inert saturated hydrocarbon solvents containing from 5 to about 12 carbon atoms inclusive such as, for example, pentane, hexane, heptane, octane, nonane, decane, and the like, and isomers thereof; cyclic hydrocarbon solvents such as cyclopentane and cyclohexane; aromatic solvents containing from 6 to 10 carbon atoms inclusive such as benzene, toluene, xylene, and the like; halogenated methanes such as methylene chloride and, particularly, chloroform; and the like. Ordinarily it is preferred that the solution contain less than about 5 percent by weight polymer to avoid solutions which are too viscous to allow easy stirring and handling. If a non-solvent for the polymer is employed there is no dilution requirement because no viscosity problem exists.

The following examples illustrate the invention but are not to be construed as being limitative thereof.

Specific viscosity was determined using a solution of 0.200 gram of polymer in 100 milliliters of benzene in a suspended-level Ubbelohde viscosimeter at 30° C. Reduced viscosity, which is derived from specific viscosity, is reported. Reduced viscosity is defined as the quotient of the specific (kinematic) viscosity divided by the grams of polymer dissolved in a deciliter of solvent.

*Example 1*

Three grams of cis-1,4-polybutadiene were dissolved in 100 milliliters benzene by gentle agitation at 25° C. The solution was filtered under a nitrogen atmosphere into a nitrogen-purged, creased 500-milliliter reaction flask equipped with a stirrer, thermometer, nitrogen inlet, and a dropping pipet. The temperature of the polymer solution was lowered to 5° C. with an ice bath and 15 grams of anhydrous sodium methoxide was added. From the dropping pipet was then added over a period of one hour 38.3 milliliters ethyl trichloroacetate. After a few milliliters ethyl trichloroacetate had been added the mixture became viscous, but the viscosity decreased upon further addition of the ester. After addition of the ester was complete the temperature of the mixture was lowered to about 0° C. As the reaction proceeded, the solution became brown in color and increasingly viscous until after 3.5 hours 100 milliliters of benzene was added as a diluent. The reaction was allowed to proceed overnight at 0° C. To this solution was added 50 milliliters of benzene as a diluent before filtering and precipitating the filtrate by pouring it slowly with stirring into excess isopropanol. The precipitate was filtered and washed wtih isopropanol, with water containing 10 percent isopropanol, and finally with water alone. The product was then dried at 25° C. under high vacuum for three hours and then overnight at 50° C.

The polymer yield was 4.4 grams of finely divided, pale tan particles having a softening point of 41–45° C. A plaque prepared from the product and molded on a Carver Laboratory Press at 150° C. was clear, light yellow, and non-tacky. Another plaque molded at 80° C. and 4000 p.s.i. softened at 44–49° C. Chlorine analysis indicated the presence of 48.06 percent combined chlorine, evidence that about 92 percent of the double bonds in the original polybutadiene had been consumed. The material was completely soluble in benzene and had a reduced viscosity at 30° C. of 0.52. Infrared spectra were consistent with a dichlorocyclopropane-unit containing polymer.

*Example 2*

In a manner similar to that described in Example 1, 4.0 grams polybutadiene (96 percent cis-1,4-, 2 percent trans-1,4-, and percent 1,2-) was dissolved in 200 milliliters benzene. The solution was filtered and 0.5 gram of insoluble polymer was discarded. The filtrate was then divided into equal volumes of solution (100 milliliters each, each containing 1.75 grams polymer). The 100 milliliter aliquots were charged into separate 250 milliliter four-necked reaction flasks A and B, and cooled to about 7° C. with stirring.

To flask A was added 0.875 gram anhydrous sodium methoxide followed by dropwise addition of 2.24 milliliters ethyl trichloroacetate.

To flask B was added 1.75 gram anhydrous sodium methoxide followed by dropwise addition of 4.48 milliliters ethyl trichloroacetate.

The reactions in A and B were allowed to proceed at 7° C. for 3 hours after which time stirring was discontinued and the temperature lowered to 0° C. The mixtures were allowed to come slowly to room temperature over several days. The mixtures were then filtered and the filtrates precipitated into isopropanol and washed as in Example 1 except that the final wash contained 0.1 gram di-t-butyl p-cresol as a stabilizer. The products from flasks A and B were dried at 25° C. under high vacuum. From A was obtained 1.3 grams and from B 1.5 grams of rubbery, brown translucent polymer. Chlorine analysis showed the presence of 7.21 percent combined chlorine in the polymer from reaction A and 20.25 percent combined chlorine in the polymer from reaction B.

*Example 3*

Two reactions similar to those performed in Example 2 were conducted. In the manner described in Example 2 for flasks A and B, to a reaction flask C was added 5.61 grams sodium methoxide and 14.4 milliliters ethyl trichloroacetate, and to reaction flask D was added 10.41 grams sodium methoxide and 26.7 milliliters ethyl trichloroacetate. Flasks C and D each contained 4.0 grams of the polybutadiene described in Example 2. The reactions were allowed to proceed at 5–10° C. for 2.5 hours before stirring was discontinued. The polymers were separated and purified as described in Example 2. From C was obtained 3.7 grams and from D 4.0 grams, of a light brown, rubbery polymer containing, respectively, 5.28 percent and 14.42 percent combined chlorine.

*Example 4*

To determine the compatibility of dihalopropane unit-containing polymers with resins, 0.4 gram of the dischlorocarbene polybutadiene adduct prepared in Example 3 (C) which contained 5.28 percent combined chlorine was mixed with 1.0 gram of a commercial poly(vinyl chloride). The mixture was fused on a Carver Laboratory Press at 100–200° C. A clear, flexible plaque was produced.

*Example 5*

A 3.0 gram sample of cis-1,4-polybutadiene was dissolved in 100 milliliters benzene. In a manner similar to that described in Example 1, this solution was placed in a 250 milliliter flask equipped with a stirrer, thermometer, and nitrogen inlet. Fifteen grams of sodium methoxide was added to the solution, and the entire mixture then cooled to 0° C. A 30 gram portion of chloroform was added over a period of 30 minutes. The mixture became viscous as the chloroform was added, necessitating addition of an additional 50 milliliters of benzene. The reaction was allowed to proceed for 4 hours after which time the reaction solution was filtered and a small amount of insoluble material discarded. The filtrate was precipitated by pouring into 1 liter of isopropanol. The precipitate was then removed by filtration and washed first with isopropanol and then with a 90:10 mixture by volume of water and isopropanol. Two and five tenths grams of a white, rubbery material was obtained which had a reduced viscosity of 2.58 and a chlorine content of 3.12 percent.

What is claimed is:

1. Tough, moldable, flame retardant polymers containing at least 50 percent by weight of recurring units having the structure (A) 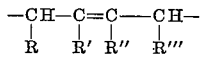

and (B) 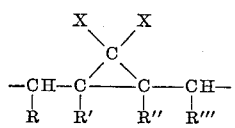

wherein R is a radical selected from the group consisting of hydrogen and methyl, R' is a radical selected from the group consisting of hydrogen and alkyl radicals containing from 1 to 5 carbon atoms, R" is a radical selected from the group consisting of hydrogen, chlorine and alkyl radicals containing from 1 to 5 carbon atom, R''' is a radical selected from the group consisting of hydrogen and alkyl radicals containing from 1 to 2 carbon atoms, and X is a halogen radical, at least 5 percent of the total number of A and B being B.

2. A polymer as in claim 1 wherein X is chlorine.
3. A polymer as in claim 1 wherein R, R', R" and R''' are hydrogen.
4. A polymer as in claim 3, wherein X is chlorine.

References Cited

UNITED STATES PATENTS 3,044,999   7/1962   Tousignant _____ 260—87.5

FOREIGN PATENTS 871,320   6/1961   Great Britain.

OTHER REFERENCES

Doering et al.: J. Am. Chem. Soc., 76, 6162 ff. (1954).
Orchin et al.: Journal of Organic Chemistry, vol. 24, 1959, pp. 139–140.

JOSEPH L. SCHOFER, *Primary Examiner.*

JAMES A. SEIDLECK, *Examiner.*

C. R. REAP, H. I. CANTOR, H. WONG,
*Assistant Examiners.*

UNITED STATES PATENT OFFICE
CERTIFICATE OF CORRECTION

Patent No. 3,369,012  Dated February 13, 1968

Inventor(s) Robert Dean Lundberg

It is certified that error appears in the above-identified patent and that said Letters Patent are hereby corrected as shown below:

Column 4, line 54, after "trans-1, 4-, and" insert --2--.

Signed and Sealed this sixteenth Day of September 1975

[SEAL]

Attest:

RUTH C. MASON
*Attesting Officer*

C. MARSHALL DANN
*Commissioner of Patents and Trademarks*